United States Patent [19]
Yang

[11] Patent Number: 6,129,798
[45] Date of Patent: Oct. 10, 2000

[54] PROCESS FOR MANUFACTURING AN ETHYLENE VINYL ACETATE INSOLE

[75] Inventor: Yung-Chi Yang, Taichung Hsien, Taiwan

[73] Assignee: Shun-Feng Lu, Feng-Yuan, Taiwan

[21] Appl. No.: 09/461,167

[22] Filed: Dec. 14, 1999

[51] Int. Cl.[7] .................................................. B29C 44/06
[52] U.S. Cl. ............................ 156/79; 264/45.1; 264/55; 264/161
[58] Field of Search ................................. 264/45.1, 46.4, 264/55, 161; 156/79

[56] References Cited

U.S. PATENT DOCUMENTS

| | | | |
|---|---|---|---|
| 3,724,105 | 4/1973 | Weight | 36/44 |
| 5,141,578 | 8/1992 | Yang | 156/79 |
| 5,147,589 | 9/1992 | Chang et al. | 264/45.1 |
| 5,177,824 | 1/1993 | Ou | 264/55 |
| 5,308,420 | 5/1994 | Yang | 156/79 |
| 5,318,645 | 6/1994 | Yang | 156/79 |
| 5,560,877 | 10/1996 | Yung et al. | 264/51 |
| 5,814,254 | 9/1998 | Bisconti | 264/46.4 |
| 5,972,257 | 10/1999 | Liu | 264/40.4 |

*Primary Examiner*—Allan R. Kuhns
*Attorney, Agent, or Firm*—Christie, Parker & Hale, LLP

[57] ABSTRACT

A process for producing an ethylene vinyl acetate insole involves weighing molding compounds for manufacturing the ethylene vinyl acetate insole. The molding compounds are mixed and rolled by means of a roller so as to form a sheet material. The sheet material is cut into a plurality of elongated strips. A predetermined amount of the strips are placed into a first mold unit, which is heated and pressurized so as to form a partially foamed insole. The partially foamed insole is placed into a second mold unit, which is heated, pressurized, and cooled so as to form a completely foamed insole. The completely foamed insole is trimmed to form a finished ethylene vinyl acetate insole.

2 Claims, 1 Drawing Sheet

PROCESS FOR MANUFACTURING AN ETHYLENE VINYL ACETATE INSOLE

BACKGROUND OF THE INVENTION

1. Field of the Invention

This invention relates to an insole manufacturing process, more particularly to a process for manufacturing an ethylene vinyl acetate insole.

2. Description of the Related Art

In a conventional EVA (ethylene vinyl acetate) insole manufacturing process, an EVA resin is mixed with a foaming agent, and the mixture is then squeezed into strips. The EVA material strips are then placed in a hot press and subjected to a foaming process. After foaming, the foamed EVA strips are placed in a water-cooling trough for cooling. After cooling, the foamed EVA strips are cut and trimmed. In some instances, some pieces of trimmed EVA pieces are adhered together. After passing through a grinding process, the EVA strips thus obtained are placed in a hydraulic machine for form setting. Thus, a whole EVA insole manufacturing process is completed. This EVA insole manufacturing process is not satisfactory, because of the following disadvantages:

1. It requires much human power and processing time.
2. Much waste material is produced. Because EVA strips are cut and sheared after the foaming process, approximately 40% or more of the foamed EVA strips are cut off and become useless. Disposal of the waste material is still a problem to settle, and it may cause environmental pollution.
3. Dusts and powders are produced during the grinding process. The dusts and powders are harmful to the workers.

In another conventional insole manufacturing process, an EVA resin is mixed with a foaming agent, and the mixture is then melted and is cooled to form pellets in an extrusion machine. The pellets are melted in an injection-molding machine, and the molten EVA material is injected into a mold unit to form a foamed insole. The foamed insole is trimmed to obtain a final product. Although an EVA insole can be obtained rapidly via the injection molding process, the cost of the injection-molding machine is relatively high. In addition, since the precision requirement of the mold unit is relatively high, the cost of the injection-molding unit is two to three times the cost of an ordinary mold unit. Therefore, the injection-molding machine is not suitable for producing a small amount of EVA insoles of various styles or designs. Further, because the molten EVA material is injected into the mold cavity via the injection nozzle and the runners in the mold unit, wastes are present in the runners after the injection-molding machine is shut down. These wastes must be removed from the injection nozzle and the runners before a succeeding injection-molding operation is carried out. This inconveniences the operator.

SUMMARY OF THE INVENTION

The object of the present invention is to provide an EVA insole manufacturing process that can overcome the drawbacks associated commonly with the aforementioned conventional EVA insole manufacturing process.

According to the present invention, a process for producing an ethylene vinyl acetate insole comprises the steps of:

weighing molding compounds for manufacturing the ethylene vinyl acetate insole;

mixing the molding compounds;

rolling the molding compounds by means of a roller so as to form a sheet material of a predetermined thickness;

cutting the sheet material into a plurality of elongated strips;

placing a predetermined amount of the strips into a first mold unit, which is heated at a first temperature and pressurized so as to form a partially foamed insole;

placing the partially foamed insole into a second mold unit, which is heated at a second temperature that is higher than said first temperature, pressurized, and cooled so as to form a completely foamed insole; and trimming the completely foamed insole.

BRIEF DESCRIPTION OF THE DRAWINGS

Other features and advantages of the present invention will become apparent in the following detailed description of a preferred embodiment of the invention, with reference to the accompanying drawing, in which.

DETAILED DESCRIPTION OF THE PREFERRED EMBODIMENTS

Figure 1:
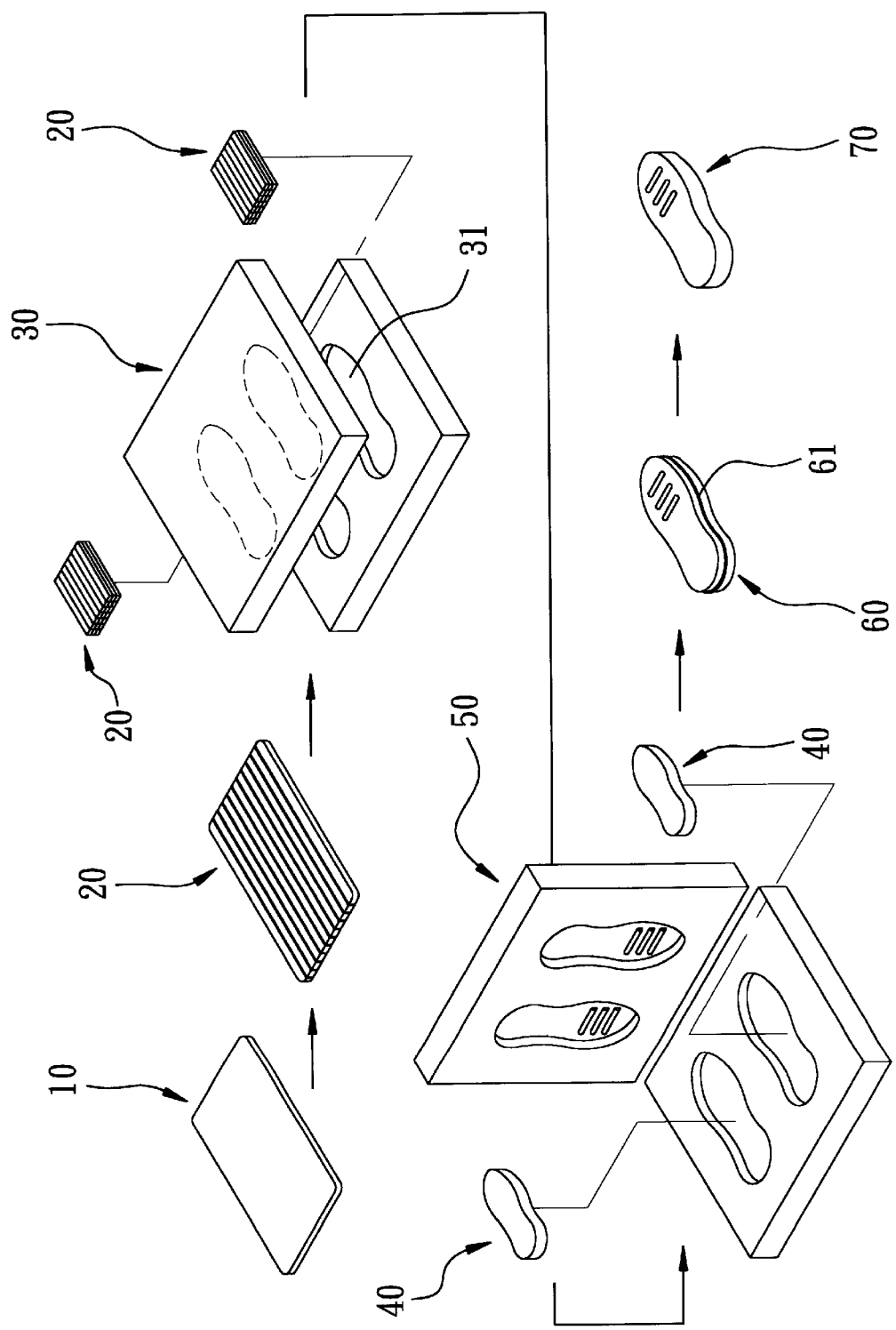
FIG. 1 is a schematic perspective view of a preferred embodiment of an EVA insole manufacturing process according to the present invention.

FIG. 1 illustrates the steps in the sequence of a preferred embodiment of an EVA (ethylene vinyl acetate copolymer resin) insole manufacturing process according to the present invention. The molding compounds for manufacturing the EVA insole, which include EVA resin pellets, fillers, blowing agents and cross-linking agents, are weighed so that the molding compounds have a predetermined weight ratio relative to one another. The molding compounds are mixed in a kneader and are rolled by rollers to form a sheet material 10 of a predetermined thickness. The distance between the rollers is adjustable in order to adjust the thickness of the sheet material 10. The sheet material 10 is then cut into a plurality of elongated strips 20. After a calculation process, a predetermined amount of strips 20 are laminated and are placed into a mold cavity of a mold unit 30. The mold unit 30 is formed of upper and lower press molds. The mold unit 30 is heated at a temperature of 80–150° C. for about 5 minutes to melt the strips 20 in the mold unit 30 in order to form a partially foamed insole 40. Thereafter, the partially foamed insole 40 is placed into a forming mold 50. The forming mold 50 is heated at a temperature of 150–70° C. for about 5–15 minutes to form a completely foamed insole 60. The completely foamed insole 60 is removed from the forming mold 50 and is cooled gradually to room temperature in an oven. Finally, the excess parts 61 of the completely foamed insole 60 are trimmed off so as to form a finished EVA insole 70.

The advantages of the process for manufacturing the EVA insole according to the present invention are as follows:

(1) Since the first and second mold units are ordinary molds, the mold cost is relatively low. Therefore, the process of the present invention is suitable for use in the production of a small amount of EVA insoles of various styles or designs.

(2) The process of the present invention is simpler than the aforementioned conventional processes because there is no grinding step in the process of the present invention.

(3) During the formation of the partially foamed insole in the first mold unit, air will not be trapped in the partially foamed insole. Therefore, the defect ratio of the EVA insole product is low.

(4) The waste material produced in the process of the present invention is much less than that produced in the aforementioned conventional processes. According to an experimental test, the waste material produced from a pair of insoles is less than about 50% of that produced from the conventional injection-molding process.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A process for producing an ethylene vinyl acetate insole, comprising the steps of:

weighing molding compounds for manufacturing said ethylene vinyl acetate insole;

mixing said molding compounds;

rolling said molding compounds by means of a roller so as to form a sheet material of a predetermined thickness;

cutting said sheet material into a plurality of elongated strips;

placing a predetermined amount of said strips into a first mold unit which is heated at a first temperature and pressurized so as to form a partially foamed insole;

placing said partially foamed insole into a second mold unit which is heated at a second temperature that is higher than said first temperature, pressurized, and cooled so as to form a completely foamed insole; and trimming said completely foamed insole.

2. The process for producing an ethylene vinyl acetate insole as claimed in claim 1, wherein said strips are laminated on one another when said strips are placed in said first molding unit.

* * * * *